United States Patent
Cadra et al.

(10) Patent No.: US 12,220,736 B2
(45) Date of Patent: Feb. 11, 2025

(54) USE OF SPECIFIC SOLUTIONS AND POLYMER MATERIALS OBTAINED FROM THESE SOLUTIONS FOR TRAPPING TOXIC CHEMICAL AGENTS

(71) Applicant: COMMISSARIAT À L'ENERGIE ATOMIQUE ET AUX ÉNERGIES ALTERNATIVES, Paris (FR)

(72) Inventors: Stéphane Cadra, Saint Avertin (FR); Benoit Blondel, Chambray-les-Tours (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 1172 days.

(21) Appl. No.: 17/040,626

(22) PCT Filed: Mar. 26, 2019

(86) PCT No.: PCT/FR2019/050686
§ 371 (c)(1),
(2) Date: Sep. 23, 2020

(87) PCT Pub. No.: WO2019/186054
PCT Pub. Date: Oct. 3, 2019

(65) Prior Publication Data
US 2021/0114070 A1 Apr. 22, 2021

(30) Foreign Application Priority Data
Mar. 27, 2018 (FR) .......................... 1852653

(51) Int. Cl.
*B09B 3/21* (2022.01)
*C08F 220/56* (2006.01)
*C08K 3/16* (2006.01)

(52) U.S. Cl.
CPC .............. *B09B 3/21* (2022.01); *C08F 220/56* (2013.01); *C08K 3/16* (2013.01)

(58) Field of Classification Search
CPC .. B09B 3/21; C08F 220/56; C08F 2/48; C08F 2/10; C08F 2/44; C08K 3/16
See application file for complete search history.

(56) References Cited

U.S. PATENT DOCUMENTS

| | | | | |
|---|---|---|---|---|
| 5,945,462 A | * | 8/1999 | Salamon | C09D 175/16 524/774 |
| 2004/0102592 A1 | * | 5/2004 | Nakamura | G02B 1/04 549/39 |
| 2012/0121459 A1 | * | 5/2012 | Edgington | C11D 3/3776 524/130 |
| 2015/0030681 A1 | * | 1/2015 | Merry | C12N 5/0663 435/177 |
| 2016/0002457 A1 | * | 1/2016 | Hamad | C08F 2/44 523/333 |

FOREIGN PATENT DOCUMENTS

WO 2014/127470 A1 8/2014
WO 2017/129688 A1 8/2017

OTHER PUBLICATIONS

Gkikas, Manos et al.: "Hydrogels That Actuate Selectively in Response to Organophosphates", Advanced Functional Materials vol. 27, No. 6, Sep. 6, 2016.
Yair, Simo et al.: Organophosphate degrading microorganisms and Enzyles as Biocatalysts in Environmental and Personal Decontamination Applications » CRC Critical reviewq in Biorechnology, Dec. 16, 2008, vol. 28, No. 4.
Romain, Castellani et al: "Efficiency enhancement of decontamination gels by a superabsorbent polymer" Colloids and surfaces a : Physiochemical and engineering aspects, Jan. 20, 2014, vol. 454, pp. 89-95.
Yang, Yu-Chu et a'. "Autocatalytic Hydrolysis of V-Type Nerve Agents" In: Journal of Organic Chemistry 1996, vol. 61, No. 24, pp. 8407-8413.
Larsson, Lennart "The Alkaline Hydrolysis of isoPropoxy-methyl-phosphoryl Flouride and some Analogues" in: Acta Chemica Scandinavica 1957, vol. 11, pp. 1131-1142.
Gershonov, E. et al. "Facile Hydrolysis-Based Chemical Destruction of hte Warfare Agents VX, GB, and HD by Alumina-Supported Fluoride Reagents" in: Journal of Organic Chemistry 2009, 74, 329-338.
Bomberg, lev et al. "Degradation of Chemical Warfare Agents by Reactive Polymeres" in: Ind. Eng. Chem. Res. 2009, vol. 48, No. 3, pp. 1650-1659.
Search Report for French application No. FR 1852653 dated Nov. 30, 2018.
International Search Report for PCT/FR2019/05086 dated Jun. 17, 2019.
Written Opinion for PCT/FR2019/05086 dated Mar. 27, 2018.
U.S. Appl. No. 16/982,700 entitled "New Solutions Based on a Thixotropic Filler and New Polymer Materials Obtained From These Solutions That Can Be Used for Trapping Toxic Chemical Agents" filed Sep. 21, 2020 (28 total pages).

* cited by examiner

Primary Examiner — Daniel Berns
Assistant Examiner — Eric Scott Sherman
(74) Attorney, Agent, or Firm — Chrisman Gallo Tochtrop LLC

(57) ABSTRACT

A solution comprising at least one protic solvent, at least one monomer comprising an (alkyl)acrylic, (alkyl)acrylate or (alkyl)acrylamide group, at least one crosslinking agent comprising at least two groups chosen from (alkyl)acrylic, (alkyl)acrylate or (alkyl)acrylamide groups, at least one photopolymerization initiator and at least one agent chosen from alkali metal halides, alkali metal phosphates, alkali metal sulfates and mixtures thereof; or—of a polymer material capable of being obtained by polymerization of the solution defined above comprising a polymer resulting from the polymerization of the monomer(s) and of the crosslinking agent(s) as defined above and trapping, at the center thereof, a liquid phase comprising at least one agent as defined above; for the trapping of at least one toxic chemical agent.

16 Claims, No Drawings

USE OF SPECIFIC SOLUTIONS AND POLYMER MATERIALS OBTAINED FROM THESE SOLUTIONS FOR TRAPPING TOXIC CHEMICAL AGENTS

CROSS-REFERENCE TO RELATED APPLICATIONS

This is a National Stage application of PCT international application PCT/FR2019/050686, filed on Mar. 26, 2019, which claims the priority of French Patent Application No. 1852653, filed Mar. 27, 2018, both of which are incorporated herein by reference in their entirety.

TECHNICAL AREA

The present invention relates to the use of specific solutions or specific polymeric materials obtained from these solutions, for the trapping of toxic chemical agents, such as organophosphorus chemical compounds.

Due to their trapping properties with respect to toxic agents, such as organophosphorus compounds, these solutions or polymeric materials may find application in the decontamination of media comprising chemical organophosphorus compounds, for example, in certain environments, such as the chemical industry, agriculture or even in sectors combating chemical gas attacks.

In general, the organophosphorus compounds present in these environments are in the form of organic compounds exhibiting proven toxicity for the human organism, the average lethal concentration per inhalation being at least 10 mg·min·m$^{-3}$, as described in *J. Org. Chem.* 1996, 61, 8407-8413. In fact, these compounds may be involved in the inhibition mechanism of acetylcholinesterase that prevents muscle relaxation and may thus cause death by asphyxiation.

These compounds may be included in the formulation of insecticides, pesticides or even chemical warfare agents and are conventionally present in the form of water-soluble oily organic compounds which, once dispersed in the environment, have a half-life in water which may range from 5 hours to 80 hours, however with the risk that the products of degradation by hydrolysis in the water remain toxic for a period of 30 to 60 days.

In view of their toxicity, a great deal of research has been undertaken to develop curative solutions to the threats linked to organophosphorus compounds, wherein one of the axes of this research aims at finding systems to catalyze the process of degradation of these compounds, in order to quickly render them inactive.

These decontaminating systems are generally in the form of liquids or powders in the form of sprays, or else in the form of a liquid imbibing a sponge, wherein the active ingredients at the origin of the decontamination may be of inorganic or organic origin.

As examples of inorganic active ingredients, mention may be made of alkaline solutions, such as sodium hydroxide solutions (NaOH), potassium hydroxide solutions (KOH), ammonium hydroxide solutions (NH$_4$OH), which were the first decontaminating solutions to be studied at the end of the 1950s, due to their effectiveness against warfare organophosphorus compounds, such as Sarin gas or Soman gas, which come into the category of type G neurotoxicants, such systems being described in *Act. Chem. Scand.* 1957, 11, 1131-1142.

From the point of view of the mechanism of action of these alkaline solutions with respect to organophosphorus compounds, it has been shown that they make it possible to increase the kinetics of hydrolysis of Sarin and Soman gases by increasing the pH value of the medium, the half-life being reduced to 8 minutes in basic medium. On the other hand, the use of alkaline solutions is ineffective against more persistent organophosphorus compounds, such as type V nerve agents (and more specifically VX and VR-55 agents).

For these type V neurotoxic agents, new solutions have been proposed, as described in *J. Org. Chem.* 2009, 74, 329-338, where, in order to improve the hydrolysis of these agents, it is proposed to adsorb them on a pulverulent mixture composed of potassium fluoride (KF) and alumina (Al$_2$O$_3$), this mixture allowing, in the presence of water, the generation of potash (KOH), which induces an increase in the pH of the medium.

As examples of organic active ingredients, it has been proposed to use α-nucleophilic organic compounds, i.e. a compound comprising a nucleophilic group adjacent to an atom carrying an electronic doublet, which doublet has the effect of strengthening the nucleophilic character of the compound. Compounds meeting this definition and effective for the decontamination of a medium comprising organophosphorus compounds such as agents of type G or V, are oximate compounds, such as 2,3-butanedione monoxime.

As an alternative, it has also been proposed to integrate these oximate functions directly into a polymer, for example, starting from a base polymer of the polyacrylonitrile type. The amidoximate groups thus generated have a high nucleophilicity with a pKa of the order of 11 to 12 (compared to 8, for conventional oximes), as described in *Ind. Eng. Chem. Res.* 2009, 48, 1650-1659, the resulting polymers exhibiting high dispersion efficiency in water with respective half-lives of 5 minutes and less than 3 minutes for VX gas and Sarin gas.

Also, in view of what exists, the inventors set out to develop new systems which may be used for the decontamination of toxic chemical agents and, more particularly, of organophosphorus compounds, and which, in addition to their effectiveness, are easy to use and suitable for all types of substrates on which toxic chemical agents may be found.

DESCRIPTION OF THE INVENTION

Thus, the invention relates to the use of:

a solution comprising at least one protic solvent, at least one monomer comprising an (alkyl)acrylic group, an (alkyl)acrylate group or an (alkyl)acrylamide group, at least one crosslinking agent comprising at least two groups chosen from (alkyl)acrylic, (alkyl)acrylate or (alkyl)acrylamide groups, at least one photopolymerization initiator and at least one agent selected from alkali halides, alkali phosphates, alkali sulphates and mixtures thereof; or a polymeric material capable of being obtained by polymerization of the solution defined above, said material comprising a polymer resulting from the polymerization of the monomer(s) and of the crosslinking agent(s) as defined above and trapping, within it, a liquid phase comprising at least one agent as defined above (namely at least one agent chosen from among alkali metal halides, alkali metal phosphates, alkali metal sulphates and mixtures thereof);

for trapping at least one toxic chemical agent.

By solution, it is specified that this refers to a homogeneous liquid mixture of the aforementioned ingredients, which means that these are all used so as to be soluble in the protic solvent of the solution.

The term protic solvent is understood to mean a polar solvent having at least one hydrogen atom capable of intervening in the formation of hydrogen bonds, an example of a protic solvent which is particularly advantageous for the invention being water, in which case the solutions of the invention may be qualified as aqueous solutions. Protic solvent, such as water, may be present in the solution at 40 to 60% by volume of the total volume of the solution.

By (alkyl)acrylic group, (alkyl)acrylate group or (alkyl)acrylamide group, is meant respectively:
- for the (alkyl)acrylic group, an acrylic group or an alkylacrylic group (which means that an alkyl group is present on the carbon carrying the double bond and the —CO— group);
- for the (alkyl)acrylate group, an acrylate group or an alkylacrylate group (which means that an alkyl group is present on the carbon carrying the double bond and the —CO— group); and
- for the (alkyl)acrylamide group, an acrylamide group or an alkylacrylamide group (which means that an alkyl group is present on the carbon carrying the double bond and the —CO— group).

An example of an (alkyl)acrylic group, (alkyl)acrylate group or (alkyl)acrylamide group is respectively a (meth)acrylic group, a (meth)acrylate group, or a (meth)acrylamide group.

As mentioned above, the solutions of the invention comprise at least one monomer comprising an (alkyl)acrylic group, an (alkyl)acrylate group, or an (alkyl)acrylamide group, such a monomer possibly corresponding to the following formula (I):

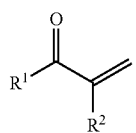

(I)

in which:
- $R^1$ represents —OR' with R' representing a hydrogen atom or an alkali element (such as sodium or potassium); —OR$^3$ with $R^3$ representing an alkyl group, preferably comprising from 1 to 4 carbon atoms (such as a methyl group, an ethyl group); or —NR$^4$R$^5$ with $R^4$ and $R^5$ representing, independently of one another, a hydrogen atom or an alkyl group, preferably comprising from 1 to 4 carbon atoms (such as a methyl group, an ethyl group);
- $R^2$ represents a hydrogen atom or an alkyl group, preferably comprising 1 to 4 carbon atoms (such as a methyl group, an ethyl group).

Advantageously, the monomer(s) of the invention comprise an (alkyl)acrylamide group, such as those corresponding to the following formula (II):

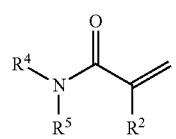

(II)

in which:
- $R^4$ and $R^5$ are as defined above;
- $R^2$ is as defined above.

In particular, it may be a monomer of formula (II), in which $R^2$ is a hydrogen atom and $R^4$ and $R^5$ represent a methyl group, such a monomer corresponding to N,N'-dimethylacrylamide.

The monomer(s) may be present in the solution in an amount of 40 to 60% by volume relative to the total volume of the solution. By way of example, when the monomer is N,N'-dimethylacrylamide, it may be present in an amount of 47.8% by volume relative to the total volume of the solution.

The solutions of the invention also comprise at least one crosslinking agent comprising at least two groups chosen from among (alkyl)acrylic, (alkyl)acrylate, (alkyl)acrylamide groups, which, in other words, means that it is a compound comprising, for example:
- at least two (alkyl)acrylic groups;
- at least two (alkyl)acrylate groups;
- at least two (alkyl)acrylamide groups;
- at least one (alkyl)acrylic group and at least one (alkyl)acrylate group;
- at least one (alkyl)acrylic group and at least one (alkyl)acrylamide group; or
- at least one (alkyl)acrylate group and at least one (alkyl)acrylamide group.

Advantageously, the crosslinking agent(s) are agents comprising at least two (alkyl)acrylate groups, such as those corresponding to the following formula (III):

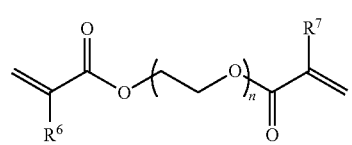

(III)

in which:
- $R^6$ and Fe represent, independently of each other, a hydrogen atom or an alkyl group, for example, comprising 1 to 4 carbon atoms (for example, a methyl group, an ethyl group);
- n corresponds to the number of occurrences of the unit in parentheses, this number ranging from 1 to 15.

By way of example, a crosslinking agent which may be used in the solutions of the invention is an agent of formula (III), in which $R^6$ and Fe are methyl groups, this agent thus corresponding to a polyethylene glycol dimethacrylate.

It is entirely possible to envisage using several distinct crosslinking agents falling within the scope of the definition of the agents of formula (III) defined above.

It is also to be understood that crosslinking agents are distinct from the monomers used in the solutions of the invention.

In particular, it is possible to use a mixture of polyethylene glycol dimethacrylate with an average molar mass of 750 g/mol, which corresponds to a mixture of several molecules of formula (III) defined above, with an average ethylene glycol unit count of 13.2. The crosslinking agent(s) may be present in the solution in an amount of 1 to 5% by volume relative to the total volume of the solution.

When it comes to the mixture of polyethylene glycol dimethacrylate mentioned above, this mixture may be present in the solution in an amount of 1.6% by volume based on the total volume of the solution.

Finally, the solutions comprise at least one photopolymerization initiator (which may also be called a photoinitiator), which initiator is a compound capable of generating free radicals when it is subjected to appropriate radiation (for example, UV radiation of between 350 and 420 nm). The radicals thus formed will thus react with the reactive sites of the compounds present in the solution (here, the polymerizable functions of the monomers and of the crosslinking agents), thus resulting in the polymerization of these compounds. The initiator(s) is/are advantageously solubilized by at least one of the constituent ingredients of the solution (for example, the protic solvent).

The photopolymerization initiator(s) capable of being used in the solutions of the invention may be initiators of the aromatic ketone family, such as 1-hydroxy-cyclohexylphenyl ketone (also known under the trade names IRGACURE® 184 or CPK®) or (phenylphosphoryl)bis(mesitylmethanone) (known under the name IRGACURE® 819), or a mixture of these two photoinitiators.

The photopolymerization initiator(s) may be present in the solution in an amount of 1 to 15 g/L. For example, when the initiator is IRGACURE® 184, it may be present in an amount of 11.5 g/L.

Finally, the solutions comprise at least one agent chosen from among alkali halides, alkali phosphates, alkali sulphates and mixtures thereof.

The inventors have observed that these agents contribute to neutralizing organophosphorus compounds and, in particular, type V warfare organophosphorus compounds, which are compounds comprising a sulfur atom, which is connected to a phosphonate group; the above-mentioned agents being able to cut the phosphorus-sulfur bonds so as to accelerate hydrolysis.

In addition, the above-mentioned agents make it possible to increase the ionic strength of the solutions containing them, which makes it possible, among other things, to increase the trapping power of organophosphorus compounds by osmotic pressure.

The agent(s) may be present in the solution in an amount of 1 to 30 g/L, preferably 1 to 15 g/L.

More specifically, the agent(s) may be chosen from among alkali metal fluorides; the alkali metal fluoride(s) may be present in the solution in an amount of 1 to 15 g/L.

A particularly effective agent that may be used in the solutions of the invention is potassium fluoride, which may be present, for example, in the solution in an amount of 11.5 g/L.

By way of example, the solutions of the invention may be composed exclusively of at least one protic solvent, of at least one monomer comprising an (alkyl)acrylic group, an (alkyl)acrylate group or an (alkyl)acrylamide group, of at least one crosslinking agent comprising at least two groups chosen from among (alkyl)acrylic, (alkyl)acrylate or (alkyl) acrylamide groups, at least one photopolymerization initiator, and at least one agent chosen from among alkali halides, alkali phosphates, alkali sulfates and mixtures thereof.

A solution according to the invention is a solution comprising or consisting exclusively of the following ingredients:

- as a protic solvent, water;
- as a monomer, N,N'-dimethylacrylamide;
- as a crosslinking agent, a polyethylene glycol dimethacrylate or a mixture thereof;
- as a photopolymerization initiator, 1-hydroxy-cyclohexylphenyl ketone (also known under the trade name IRGACURE® 184);
- as an agent, potassium fluoride.

The solutions of the invention constitute liquid formulations applicable to a wide range of objects contaminated with organophosphorus compounds due to the good compatibility of these solutions with a wide range of surfaces (such as a metallic surface such as an aluminum surface, a surface covered with a layer of paint, an enamel surface, or a surface of plastic material).

It is specified here that, by good compatibility, is meant that no degradation (such as a phenomenon of corrosion, coloring, swelling, flaking, or alteration perceptible to the naked eye) is visible after 1 hour of contact with the solutions of the invention.

Once applied to such a surface, for example, by coating, injection or spraying, the solutions of the invention, by virtue of their intrinsic properties linked to the nature of the abovementioned ingredients, will be able to integrate, by natural diffusion and natural miscibility, the toxic chemical agents, such as organophosphorus compounds initially present on the surface. Solutions that have captured these toxic agents may then be gelled under the influence of natural or artificial radiation (which involves the application of radiation other than radiation from natural light). More specifically, under the effect of the appropriate radiation, the photopolymerization initiator(s) are activated and initiate the polymerization of the monomer(s) and of the crosslinking agent(s) in the solution. At the end of the polymerization, the result is thus a solidification of the solution in the form of a polymer material, which is in the form of a cohesive gel (which may be qualified as a hydrogel when the protic solvent is water), in which the toxic agents are physically trapped in the remaining solution, which is itself completely trapped in the polymer network of the gel. This cohesive gel constitutes a containment membrane, which is integral and may be handled, and may then be removed mechanically, for example, by simply peeling off the surface of the substrate, thus leaving a decontaminated substrate. As a result, the toxic agents thus trapped are removed from the contaminated surface without requiring the use of special rinsing, recovery or effluent treatment devices. The polymeric material constitutes a material for confining the toxic chemical agents initially present on the surface to be decontaminated.

It should also be noted that, due to the reactivity of the solution with respect to organophosphorus compounds, the organophosphorus compounds trapped in the gel may be naturally degraded in situ.

As mentioned above, to trap at least one toxic chemical agent, we may also use a polymeric material obtainable by polymerization of a solution as defined above, said material comprising a polymer resulting from the polymerization of the monomer(s) and of the crosslinking agent(s) as defined above (in other words, the polymer comprises repeating units resulting from the polymerization of the monomer(s) and of the crosslinking agent(s)) thus trapping within itself, a liquid phase (e.g. a phase comprising a protic solvent, such as water) comprising an agent selected from among alkali halides, alkali phosphates, alkali sulphates and mixtures thereof.

The specificities relating to the monomers, crosslinking agents and to the agents chosen from among the alkali metal halides, the alkali metal phosphates, the alkali metal sulphates and the mixtures thereof defined in connection with the solutions, are also valid for the materials.

When the liquid phase comprises, as the protic solvent, water, the above-mentioned polymeric material may be referred to as a hydrogel material.

By hydrogel material, it is specified that this is a material in the form of a gel consisting of a polymer in which an aqueous phase is retained, which conventionally corresponds to the polymerization medium (i.e. the medium in which the polymerization takes place to form the constituent polymer of the hydrogel material), which has absorbed, in our case, the organophosphorus compounds. Due to the flexibility of the polymer network constituting the hydrogel, such a material is conventionally capable of absorbing a mass of water which may exceed 100 times the mass of the polymer structure and, in our case, at least 5 times the mass of the polymer structure.

By polymer is meant, conventionally, within the meaning of the invention, a compound consisting of the linking of one or more repeating units.

By repeating unit is meant, conventionally, within the meaning of the invention, a divalent organic group (i.e. a group forming a bridge) obtained from a monomer after polymerization of the latter, the formula of the repeating unit corresponding to that of the monomer whose double bond has been replaced by two hydrogen atoms carried by the carbon atoms carrying the double bond in the monomer.

The polymer comprises repeating units resulting from the polymerization of the monomer(s) and of the crosslinking agent(s), which means, in other words, that this polymer is a crosslinked polymer, which may comprise several chains comprising one or more repeating units resulting from the polymerization of the monomer(s) linked together by one or more repeating units (which may thus be qualified as crosslinking units) resulting from the polymerization of the crosslinking agent(s).

By way of example, the polymer may comprise a repeating unit resulting from the polymerization of a monomer of formula (I) as defined above, this repeating unit thus corresponding to the following formula (I'):

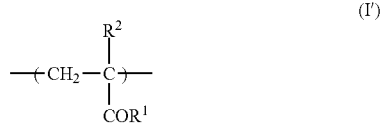

with $R^1$ and $R^2$ being as defined above, and even more specifically, the polymer may comprise a repeating unit resulting from the polymerization of a monomer of formula (II) as defined above, this repeating unit thus corresponding to the following formula (II'):

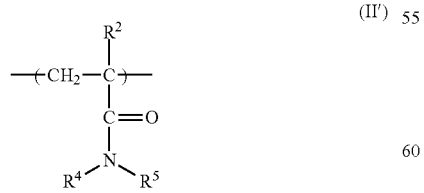

in which the $R^2$, $R^4$ and $R^5$ are as defined above, and, more particularly, $R^2$ is a hydrogen atom and $R^4$ and $R^5$ represent a methyl group, in which case the repeating unit corresponds to the following formula (II"):

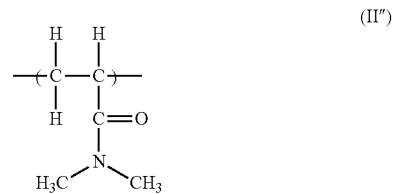

this repeating unit being obtained from the polymerization of the N,N'-dimethylacrylamide monomer.

By way of example, the polymer may also comprise a repeating unit resulting from the polymerization of a crosslinking agent of formula (III) as defined above, this repeating unit thus corresponding to the formula NIT

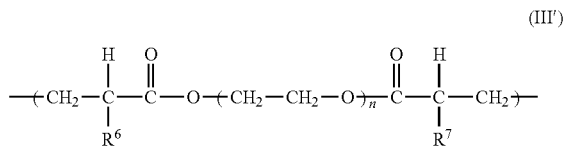

in which $R^6$, $R^7$ and n are as defined above and, more particularly, $R^6$ and $R^7$ are methyl groups.

In particular, a polymer capable of entering advantageously in the constitution of the invention is a crosslinked polymer comprising several chains comprising a repeating unit of formula (II) as defined above (or more specifically a repeating unit of formula (II') or (Ill), said chains being linked together by a repeating unit of formula (III'), which repeating unit thus constitutes a crosslinking unit.

From a structural point of view, the hydrogel material is advantageously in the form of a membrane, for example, a flat membrane having a thickness which may range from 1 mm to 2 cm, the membrane being able to fulfill a patch function.

As mentioned above, the solutions and the polymeric materials of the invention are, by virtue of their ingredients, capable of sequestering or trapping organophosphorus compounds.

The invention also relates to a process for trapping a chemical toxic agent, such as an organophosphorus compound, present on a surface contaminated with said chemical toxic agent, said agent possibly being, for example, an organophosphorus compound.

More specifically, this process comprises the following steps:
  a step of bringing a solution as defined above into contact with the contaminated surface;
  a step of forming a polymeric material as defined above by polymerization of the monomer(s) and of the crosslinking agent(s) present in the solution;
  a step of removing the polymeric material thus formed from said surface, by means of which said surface is thus depleted or even devoid of said chemical toxic agent.

The contacting step may be carried out by coating the surface to be decontaminated with the solution or by spraying the solution on the surface to be decontaminated.

The step of forming the polymeric material may be performed by applying radiation to initiate the photopolymerization through the action of the photopolymerization initiators.

This radiation may advantageously belong to the field of ultraviolet radiation, i.e. radiation exhibiting at least one wavelength of the ultraviolet range, i.e. a wavelength of between 350 nm and 420 nm.

The radiation intensity may be between 1000 and 10,000 $W/m^2$.

The origin of the radiation may be natural (for example, exposure to natural sunlight) or artificial, such as, for example, radiation from a UV lamp. By way of example, an artificial light source which may be used in the context of the invention may be a UV lamp emitting a wavelength of 405 nm with a power of 9000 WM'.

Solutions and materials that may be used in the context of the use and the trapping method according to the invention are also novel and are the object of the invention, namely:
- a solution which may be used for trapping at least one toxic chemical agent, said solution comprising at least one protic solvent, at least one monomer comprising an (alkyl)acrylic group, an (alkyl)acrylate group or an (alkyl)acrylamide group, at least one crosslinking agent comprising at least two groups selected from among (alkyl)acrylic, (alkyl)acrylate or (alkyl)acrylamide groups, at least one photopolymerization initiator and at least one agent selected from alkali halides with the exclusion of sodium chloride, alkali phosphates, alkali sulfates and mixtures thereof;
- a polymeric material capable of being obtained by polymerization of a solution as defined above with respect to the use and of the trapping process, the material comprising a polymer resulting from the polymerization of the monomer(s) and of the crosslinking agent(s) as defined above and trapping, within itself, a liquid phase comprising at least one agent as defined above (namely at least one agent chosen from among alkali halides, alkali phosphates, alkali sulphates and mixtures thereof.

The specific features relating to the solutions and to the materials defined in the context of the description of the use which is the object of the invention, and of the trapping method which is the object of the invention are also valid for the solutions and the materials as such and the objects of the invention.

The invention will now be described in light of the examples below, these examples being provided only by way of illustration of the invention and in no way constituting a limitation thereof.

DETAILED PRESENTATION OF PARTICULAR EMBODIMENTS

Example 1

This example illustrates the preparation of a solution according to the invention.

In a 30 mL pill container, previously dried in an oven overnight at 90° C. under dynamic vacuum and conditioned under argon, are introduced successively 10.4 mL of N,N'-dimethylacrylamide, 11.0 mL of distilled water, 0.35 mL of poly(ethylene glycol)dimethacrylate with an average molar mass of 750 g/mol, 0.25 g of IRGACURE® 184 and 0.25 g of potassium fluoride.

A magnetic bar is introduced into the resulting medium. The medium is then purged with argon and placed under magnetic stirring until the solid compounds, such as IRGACURE® 184 and potassium fluoride, are completely dissolved.

The resulting solution is stored under argon until use.

Example 2

This example aims to evaluate the decontaminating action of the solution prepared in Example 1 on a contaminated support.

To do this, two flat samples of dimensions 2.5 cm*2.5 cm are cut from a raw aluminum plate.

On each of the two samples are deposited 10 µL of a simulant: methyl methylphosphonate (represented by the abbreviation DMMP).

It is specified that, by simulant, is meant a compound exhibiting physicochemical properties similar to warfare organophosphorus compounds (in particular in terms of solubility and boiling point) while being slightly harmful to the human organism.

In order to come closer to actual operating conditions, a waiting time of 10 minutes is observed to allow the simulant to penetrate the pores of the samples.

At the end of this waiting time, the first sample is rinsed with 2×0.5 mL of absolute ethanol. The rinsing solution is taken for testing and then it is analyzed by gas chromatography coupled with mass spectrometry (GC-MS). The area of the signal corresponding to DMMP on the chromatogram is noted and will constitute the comparative value.

At the same time, 200 µL of the solution of the invention is introduced into the area contaminated with DMMP of the second sample. The sample is placed in a UV oven and then irradiated at 405 nm at a rate of 9000 Watts/$m^2$. At this power level, complete gelling of the solution of the invention is achieved in 4 minutes. The solution then takes on the appearance of a flexible membrane. The irradiation is stopped and then a waiting time of one hour since the solution of the invention came into contact with the support, is observed.

At the end of the waiting time, the membrane resulting from the polymerization of the compound of the invention is peeled from the support using pliers. The support is rinsed with 2×0.5 mL of absolute ethanol. A test sample of the rinsing solution is taken. This is analyzed by GC-MS, then the area of the signal corresponding to DMMP is compared with the value obtained previously.

During this test, no trace of DMMP was detected on the support treated with the solution of the invention, which means that the amount of DMMP is below the detection threshold of the device.

No visual degradation is visible on the base material.

Example 3

This example is similar to Example 2, except that the support material used is painted sheet metal (automotive grade lacquer paint).

In this case, complete gelling of the solution of the invention is achieved after 9 minutes of insolation.

During this test, no trace of DMMP was detected on the support treated with the solution of the invention, which means that the amount of DMMP is below the detection threshold of the device.

No visual degradation is visible on the base material.

Example 4

This example is similar to Example 2, except that the support material used is earthenware. The solution was brought into contact with the enamel face.

During this test, no trace of DMMP was detected on the support treated with the solution of the invention, which means that the amount of DMMP is below the detection threshold of the device.

No visual degradation is visible on the base material.

Example 5

This example is similar to Example 2, except that the support material used is a rough thermoplastic material consisting of 85% polypropylene, 15% talc and a coloring pigment (<1%).

In this case, complete gelling of the composition is achieved after 8 minutes of insolation.

During this test, no trace of DMMP was detected on the support treated with the solution of the invention, which means that the amount of DMMP is below the detection threshold of the device.

No visual degradation is visible on the base material.

In summary, for all the decontamination tests, the percentage of residual DMMP may be calculated. This is the ratio of the areas of the GC signal of DMMP without and with treatment using the compound of the invention.

The measurements performed are summarized below:

|  | Initial | After treatment with the invention | |
| --- | --- | --- | --- |
| Sample | GC* area | GC* area | Residual DMMP %** |
| Aluminum | 137 670 887 | 0 | <0.1% |
| Earthenware | 135 550 976 | 0 | <0.1% |
| Painted sheet | 58 926 974 | 0 | <0.1% |
| Thermoplastic | 45 595 837 | 0 | <0.1% |

*Area, in arbitrary units, of the chromatogram signal corresponding to the DMMP.
**Value considered non-zero due to the detection limit of the GC-MS device.

For all of the cases studied, the treatment of contaminated surfaces with the invention makes it possible to reduce the levels of residual contaminants (DMMP) to particularly low values (less than 0.1%). This means that one liter of the solution of the invention is capable of removing approximately 50 mL of organophosphorus compound from a contaminated surface, which demonstrates the high level of efficiency of the solutions of the invention.

What is claimed is:

1. A method of trapping a chemical toxic agent present on a surface contaminated by said chemical toxic agent comprising the following steps:
    a step of bringing into contact with the contaminated surface of solution composed exclusively of at least one protic solvent, at least one monomer comprising an (alkyl) acrylic group, an (alkyl) acrylate group or an (alkyl) acrylamide group, at least one crosslinking agent comprising at least two groups chosen from (alkyl) acrylic, (alkyl) acrylate or (alkyl) acrylamide groups, at least one photopolymerization initiator and at least one agent selected from among alkali halides, alkali phosphates, alkali sulphates and mixtures thereof;
    a step of forming a polymeric material by polymerizing the monomer(s) and the crosslinking agent(s) present in the solution, whereby it is obtained a polymeric material comprising a polymer resulting from the polymerization of the monomer(s) and of the crosslinking agent(s) as defined above and trapping, within itself, a liquid phase comprising at least one agent as defined above;
    a step of removing the polymeric material thus formed from said surface, by means of which said surface is thus depleted or even devoid of said chemical toxic agent.

2. The method according to claim 1, wherein the protic solvent is water.

3. The method according to claim 1, wherein the protic solvent is present in an amount of 40 to 60% by volume relative to the total volume of the solution.

4. The method according to claim 1, wherein the at least one monomer comprising an (alkyl) acrylic group, an (alkyl) acrylate group, or an (alkyl) acrylamide group corresponds to the following formula (I):

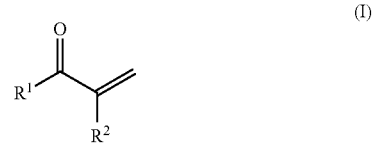

in which:
    $R^1$ represents —OR' with R' representing a hydrogen atom or an alkali element; or —OR$^3$ with $R^3$ representing an alkyl group; or —NR$^4$R$^5$ with $R^4$ and $R^5$ representing, independently of each other, a hydrogen atom or an alkyl group; and
    $R^2$ represents a hydrogen atom or an alkyl group.

5. The method according to claim 1, in which the at least one monomer is a monomer corresponding to the following formula (II):

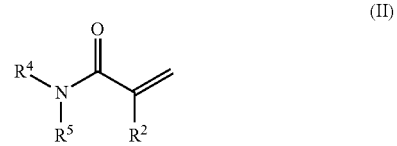

in which:
    $R^4$ and $R^5$ are represent, independently of each other, a hydrogen atom or an alkyl group;
    $R^2$ is represents a hydrogen atom or an alkyl group.

6. The method according to claim 1, wherein the monomer is N,N'-dimethylacrylamide.

7. The method according to claim 1, wherein the at least one crosslinking agent comprises at least two (alkyl) acrylate groups.

8. The method according to claim 1, in which the at least one crosslinking agent corresponds to the following formula (III):

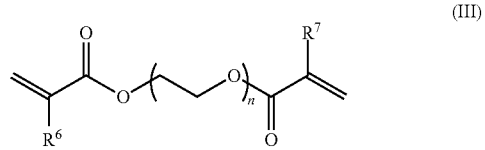

in which:
    $R^6$ and $R^7$ represent, independently of each other, a hydrogen atom or an alkyl group;

n corresponds to the unit count in parentheses, this number ranging from 1 to 15.

9. The method according to claim 1, wherein the crosslinking agent is polyethylene glycol dimethacrylate.

10. The method according to claim 1, wherein the at least one crosslinking agent is present in an amount of 1 to 5% by volume relative to the total volume of the solution.

11. The method according to claim 1, in which the at least one photopolymerization initiator is an initiator of the aromatic ketone family.

12. The method according to claim 1, wherein the photopolymerization initiator is 1-hydroxy-cyclohexylphenyl ketone.

13. The method according to claim 1, in which the at least one photopolymerization initiator is present in an amount of 1 to 15 g/L.

14. The method according to claim 1, in which the at least one agent is present in an amount of 1 to 15 g/L.

15. The method according to claim 1, wherein the agent is potassium fluoride.

16. The method according to claim 1, wherein the chemical toxic agent is an organophosphorus compound.

\* \* \* \* \*